US012703186B2

(12) United States Patent
Ishimatsu et al.

(10) Patent No.: US 12,703,186 B2
(45) Date of Patent: Aug. 11, 2026

(54) LIQUID EJECTION HEAD

(71) Applicant: CANON KABUSHIKI KAISHA, Tokyo (JP)

(72) Inventors: Shin Ishimatsu, Kanagawa (JP); Takatsugu Moriya, Tokyo (JP); Koichi Ishida, Tokyo (JP); Keiji Tomizawa, Kanagawa (JP); Yoshihiro Hamada, Kanagawa (JP); Fumi Tanaka, Kanagawa (JP); So Aizawa, Kanagawa (JP); Kyosuke Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 155 days.

(21) Appl. No.: 18/505,957

(22) Filed: Nov. 9, 2023

(65) Prior Publication Data

US 2024/0157705 A1 May 16, 2024

(30) Foreign Application Priority Data

Nov. 14, 2022 (JP) ................................ 2022-181661

(51) Int. Cl.
*B41J 2/175* (2006.01)
*B41J 2/14* (2006.01)
*B41J 2/18* (2006.01)

(52) U.S. Cl.
CPC ......... *B41J 2/17563* (2013.01); *B41J 2/1404* (2013.01); *B41J 2/18* (2013.01)

(58) Field of Classification Search
CPC ........ B41J 2/17563; B41J 2/1404; B41J 2/18; B41J 2002/14403
See application file for complete search history.

(56) References Cited

U.S. PATENT DOCUMENTS

2021/0387453 A1* 12/2021 Maruyama ........... B41J 2/14145

FOREIGN PATENT DOCUMENTS

| | | | |
|---|---|---|---|
| JP | H06312506 | A | 11/1994 |
| JP | 2005246619 | A | 9/2005 |
| JP | 6853309 | B2 | 3/2021 |
| JP | 2021194825 | A | 12/2021 |

* cited by examiner

*Primary Examiner* — Geoffrey S Mruk
(74) *Attorney, Agent, or Firm* — Canon U.S.A., Inc. IP Division

(57) ABSTRACT

A liquid ejection head includes ejection nozzles, pressure compartments, a supply port, and first pillar structures. The pressure compartments which each communicate with a corresponding ejection nozzle of the ejection nozzles and are each combined with an energy generating element configured to generates ejection energy for ejecting liquid. The supply port supplies the liquid to the pressure compartments. The first pillar structures are arranged between the supply port and the pressure compartments. The pressure compartments is each defined by a flow path walls arranged in line and parallel to each other. A liquid flow path is formed and configured to allow the liquid to flow through the liquid flow path from the at least one supply port via the first pillar structures into the pressure compartments. A longest clearance between the first pillar structures is smaller than a shortest clearance between the flow path walls and the first pillar structures.

17 Claims, 12 Drawing Sheets

LIQUID EJECTION HEAD

BACKGROUND

Field

The present disclosure relates to a liquid ejection head that ejects liquid, such as ink.

Description of the Related Art

As an example of the liquid ejection head, Japanese Patent No. 6853309 discusses a fluid ejection apparatus that ejects fluid. In this fluid ejection apparatus, the fluid flows from a fluid supply hole into a plurality of fluid ejection chambers via a common manifold. Each of the fluid ejection chambers is provided with an ejection element for ejecting the fluid from a nozzle. A plurality of pillar structures is provided near an inlet of each fluid ejection chamber. These pillar structures function as a filter to catch foreign matter in the fluid, thereby preventing the foreign matter from blocking the inlet of each fluid ejection chamber.

In the fluid ejection apparatus discussed in Japanese Patent No. 6853309, foreign matter in the fluid caught between pillar structures or between a pillar structure and a sidewall of an inlet acts as a resistance to the fluid and hinders movement of the liquid in an ejection operation in the fluid ejection chamber. As a result, the liquid ejection performance can deteriorate.

SUMMARY

The present disclosure is directed to providing a liquid ejection head capable of reducing a decrease in liquid ejection performance.

According to an aspect of the present disclosure, a liquid ejection head includes a plurality of ejection nozzles configured to eject liquid, a plurality of pressure compartments which each communicate with a corresponding ejection nozzle of the plurality of ejection nozzles and are each combined with an energy generating element configured to generates ejection energy for ejecting the liquid, at least one supply port configured to supply the liquid to the plurality of pressure compartments, and a plurality of first pillar structures arranged between the at least one supply port and the plurality of pressure compartments, wherein the plurality of pressure compartments is each defined by a plurality of flow path walls arranged in line and parallel to each other, wherein a liquid flow path is formed and configured to allow the liquid to flow through the liquid flow path from the at least one supply port via the plurality of first pillar structures into the plurality of pressure compartments, and wherein a longest clearance between the plurality of first pillar structures is smaller than a shortest clearance between the plurality of flow path walls and the plurality of first pillar structures.

Further features of the present disclosure will become apparent from the following description of exemplary embodiments with reference to the attached drawings.

DESCRIPTION OF THE EMBODIMENTS

Hereinafter, exemplary embodiments of the present disclosure will be described in detail with reference to the drawings. Constituent elements described in the exemplary embodiments are merely examples, and the scope of the present disclosure is not intended to be limited thereto.

First, a liquid ejection apparatus on which a liquid ejection head according to exemplary embodiments of the present disclosure is mounted will be described.

Figure 1:
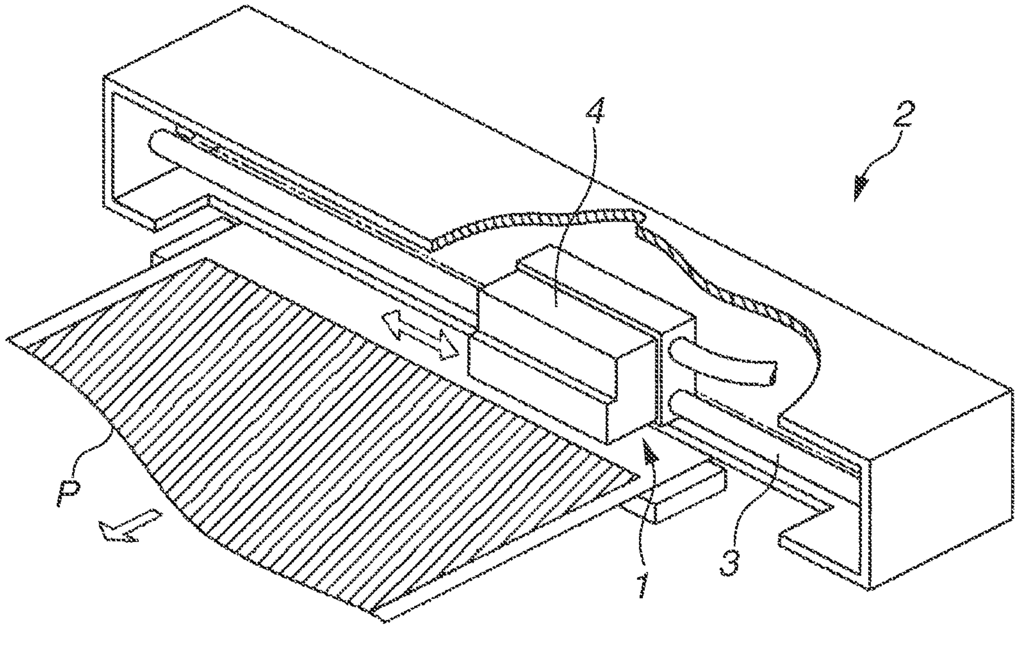
FIG. 1 is a perspective view schematically illustrating a configuration of a liquid ejection apparatus on which a liquid ejection head according to exemplary embodiments of the present disclosure is mounted.

FIG. 1 is a perspective view schematically illustrating a configuration of the liquid ejection apparatus. FIG. 1 illustrates a state in which a part of a housing is cut away so that an internal structure of the liquid ejection apparatus can be seen.

In FIG. 1, a liquid ejection apparatus 2 is a serial scan type recording apparatus, and includes a liquid ejection head 1 that ejects liquid, such as ink. The liquid ejection head 1 is mounted on a carriage 4 so as to eject the liquid toward a recording medium P. The carriage 4 is reciprocated on a guide shaft 3 by a motor (not illustrated) and a driving force transmission mechanism (not illustrated), such as a belt for transmitting the driving force of the motor. The recording medium P is a medium on which recording (printing or the like) can be performed using the liquid, and is, for example, paper or another medium. The carriage 4 is conveyed in a direction intersecting the moving direction of the carriage 4 by a conveying mechanism, such as a feed roller (not illustrated). The reciprocation of the carriage 4 allows the liquid ejection head 1 to be moved relative to the recording medium P. The movement direction of the carriage 4 is the main scanning direction, and the conveyance direction of the recording medium P is the sub-scanning direction.

The liquid ejection apparatus 2 repeats a recording operation of ejecting the liquid, such as ink, toward the recording medium P and a transport operation of transporting the recording medium P in the sub-scanning direction by a distance corresponding to the recording width while moving the liquid ejection head 1 in the main scanning direction. Thus, information is recorded on the recording medium P.

Figure 2:
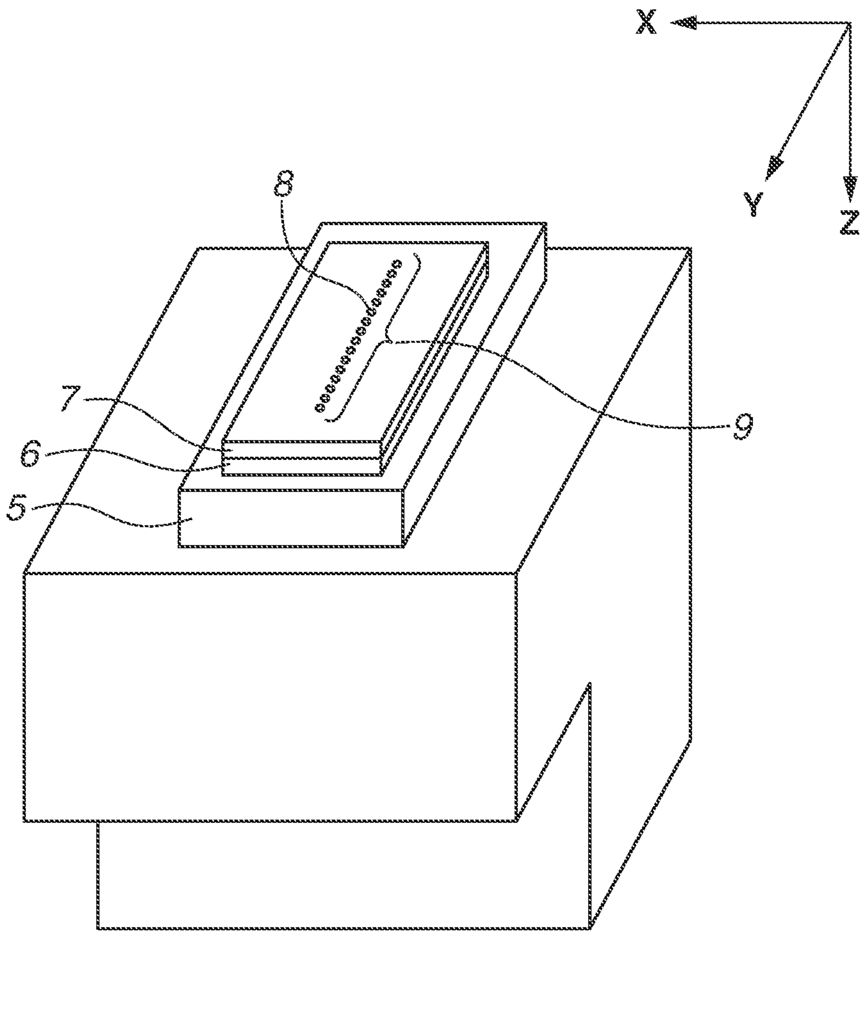
FIG. 2 is a perspective view of the liquid ejection head illustrated in FIG. 1.

FIG. 2 is a perspective view of the liquid ejection head 1 illustrated in FIG. 1. In FIG. 2, an X direction corresponds to the main scanning direction, and a Y direction corresponds to the sub-scanning direction.

As illustrated in FIG. 2, the liquid ejection head 1 includes a support member 5, a recording element substrate 6, and an ejection port member 7. The support member 5 supports the recording element substrate 6. The ejection port member 7 is bonded to the recording element substrate 6. The ejection port member 7 includes an ejection nozzle array 9 in which a plurality of ejection nozzles 8 for ejecting the liquid is arranged in line at substantially equal intervals in the Y direction. The number of the ejection nozzle array 9 provided may be two or more. Although not illustrated in FIG. 2, elements (an energy generating element, a pressure compartment, a common liquid chamber, a flow path, and the like) for ejecting the liquid from the ejection nozzles 8 are formed in a bonding portion between the recording element substrate 6 and the ejection port member 7. The liquid stored in a tank is supplied to the recording element substrate 6 through a flow path provided in the support member 5.

Figure 3:
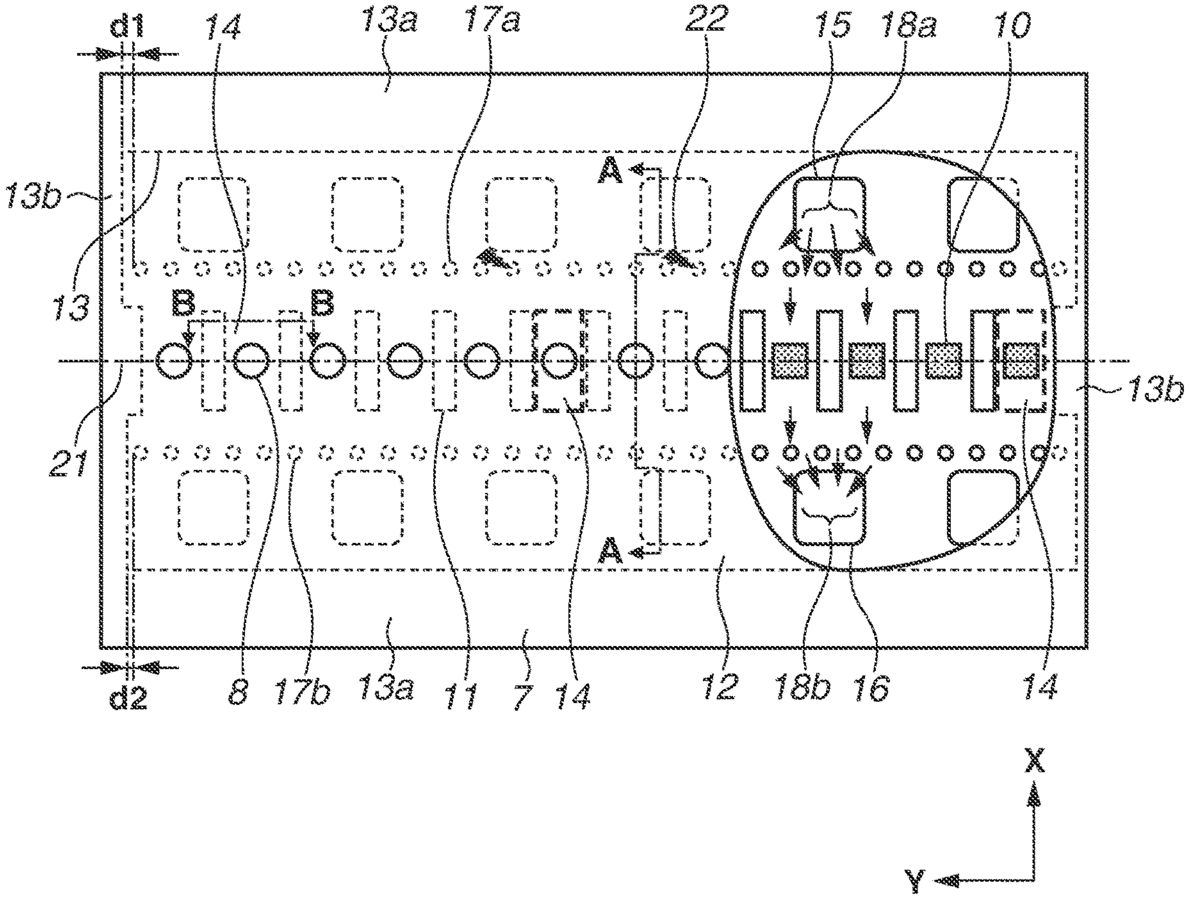
FIG. 3 is a schematic view illustrating the configuration of the liquid ejection head according to a first exemplary embodiment of the present disclosure.

A first exemplary embodiment will be described. FIG. 3 is a schematic view illustrating a configuration of the liquid ejection head 1 according to the first exemplary embodiment of the present disclosure.

In FIG. 3, the X direction corresponds to the main scanning direction, and the Y direction corresponds to the sub-scanning direction. In FIG. 3, an internal configuration of the liquid ejection head 1 as viewed from the ejection port member 7 side is indicated by broken lines, and a part of the ejection port member 7 is cut away so that the internal configuration can be seen.

As illustrated in FIG. 3, the plurality of ejection nozzles 8 is arranged in line at substantially equal intervals in the Y direction in the ejection port member 7. The recording element substrate 6 includes a plurality of energy generating elements 10, a common liquid chamber 12, a plurality of pressure compartments 14, a plurality of supply ports 15, a plurality of discharge ports 16, a plurality of first pillar structures 17*a*, and a plurality of second pillar structures 17*b*. With the row of the ejection nozzles 8 taken as a center line 21, the supply ports 15 and the first pillar structures 17*a* are arranged on one side of the center line 21, and the discharge ports 16 and the second pillar structures 17*b* are arranged on the other side of the center line 21. For example, the supply ports 15 and the first pillar structures 17*a*, and the discharge ports 16 and the second pillar structures 17*b* may be arranged so as to be line-symmetric with respect to the center line 21.

The common liquid chamber 12 has a sidewall 13 surrounding the pressure compartments 14, the supply ports 15, the discharge ports 16, the first pillar structures 17*a*, and the second pillar structures 17*b*. The sidewall 13 includes two first sidewalls 13*a* extending in the X direction and parallel to each other and two second sidewalls 13*b* extending in the Y direction and parallel to each other. The common liquid chamber 12 communicates with each pressure compartment 14. Each pressure compartment 14 is defined by a plurality of flow path walls 11 which are parallel to each other and are arranged in line at substantially equal intervals (for example, predetermined intervals) in the Y direction. In the present exemplary embodiment, a space between adjacent two of the flow path walls 11 (a black frame indicated by a broken line in FIG. 3) is one pressure compartment 14, and a space between each of the flow path walls 11 closet to the sidewall 13 and the sidewall 13 (a black frame indicated by a broken line in FIG. 3) is another pressure compartment 14. The pressure compartments 14 and the ejection nozzles 8 have a one-to-one correspondence relationship, and the pressure compartments 14 communicate with the ejection nozzles 8. Each pressure compartment 14 is combined with the corresponding energy generating element 10 that generates ejection energy for ejecting the liquid from the corresponding ejection nozzle 8. As the energy generating element 10, for example, a heating resistance element that generates a bubble to eject the liquid from the ejection nozzle 8 can be used.

The supply ports 15 are arranged in line at substantially equal intervals in the Y direction, and the liquid is supplied from each supply port 15 to the common liquid chamber 12. The shape of each supply port 15 is substantially a square, but is not limited thereto. The shape may be another form. The number of the supply ports 15 may be one or more. The first pillar structures 17*a* are provided between the supply ports 15 and the pressure compartments 14 in the X direction, and are arranged in line at substantially equal intervals in the Y direction. A liquid flow path 18*a* is formed through which the liquid flows from the supply ports 15 via the first pillar structures 17*a* to the pressure compartments 14.

The discharge ports 16 are arranged in line at substantially equal intervals in the Y direction. The shape of each discharge port 16 is substantially a square, but is not limited thereto. The shape may be another form. The number of the discharge ports 16 may be one or more. The second pillar structures 17*b* are provided between the discharge ports 16 and the pressure compartments 14 in the X direction, and are arranged in line at substantially equal intervals in the Y direction. A liquid flow path 18*b* is formed in which the liquid that has passed through the flow path walls 11 is ejected into the discharge ports 16 via the second pillar structures 17*b*. Further, the second pillar structures 17*b* desirably have the same shape as the first pillar structures 17*a*. In the present exemplary embodiment, the first pillar structures 17*a* and the second pillar structures 17*b* are round columns, but are not limited thereto. The first pillar structures 17*a* and the second pillar structures 17*b* may be a pillar structure other than a round column as long as the resistance of the fluid to the structure is small. The liquid ejected from the discharge ports 16 is supplied to the supply ports 15 by a liquid circulation mechanism (not illustrated) of the liquid ejection apparatus 2.

Figure 4A:
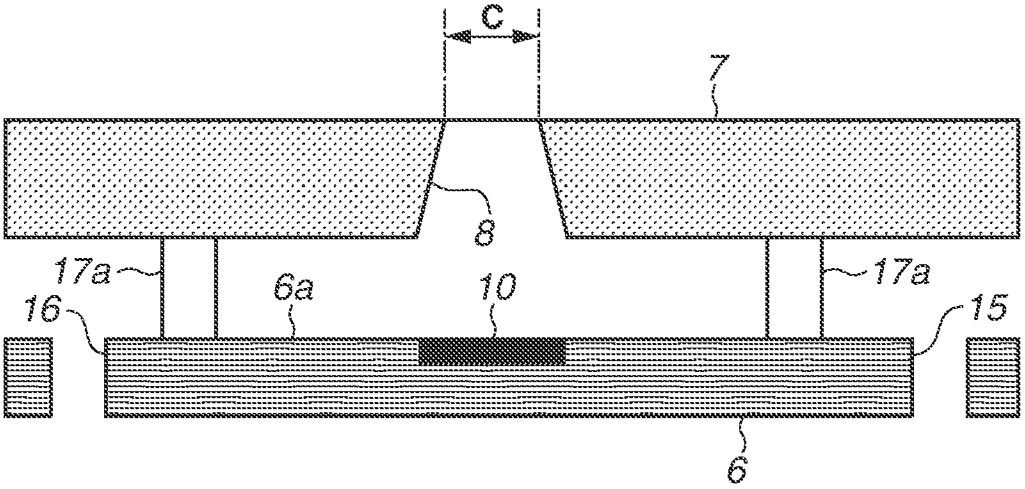
FIGS. 4A and 4B are cross-sectional views of a liquid ejection portion of the liquid ejection head illustrated in FIG. 3.
Figure 4B:
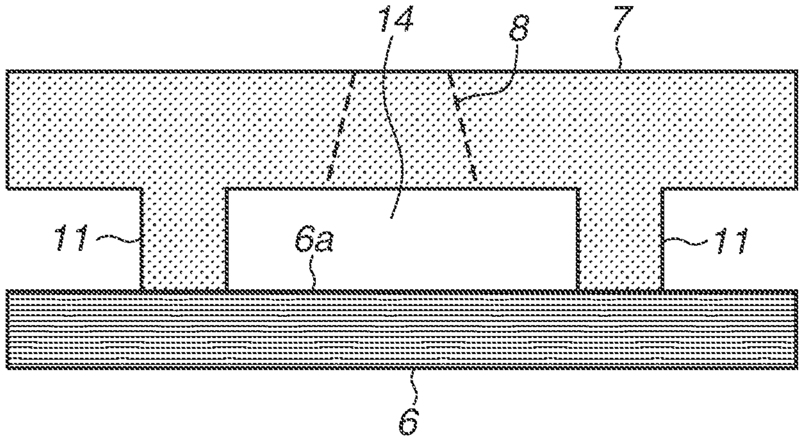

FIGS. 4A and 4B are cross-sectional views of a liquid ejection portion of the liquid ejection head 1 illustrated in FIG. 3. FIG. 4A is a cross-sectional view schematically illustrating a cross-sectional structure of the liquid ejection head 1 taken along a line A-A in FIG. 3. FIG. 4B is a cross-sectional view schematically illustrating a cross-sectional structure of the liquid ejection head 1 taken along a line B-B in FIG. 3.

As illustrated in FIG. 4A, each energy generating element 10 is provided at a position opposed to the corresponding ejection nozzle 8 in the vicinity of a first surface 6*a* of the recording element substrate 6. The first pillar structures 17*a* are provided on the first surface 6*a* of the recording element substrate 6. As illustrated in FIG. 4B, a space defined by adjacent two of the flow path walls 11 is one pressure compartment 14. The flow path walls 11 are provided on the first surface 6*a* of the recording element substrate 6. In other words, the first pillar structures 17*a* and the flow path walls 11 are provided on the same first surface 6*a*. Although not illustrated in FIGS. 4A and 4B, the second pillar structures 17*b*, the supply ports 15, and the discharge ports 16 are also provided on the first surface 6*a* of the recording element substrate 6.

Figure 5:
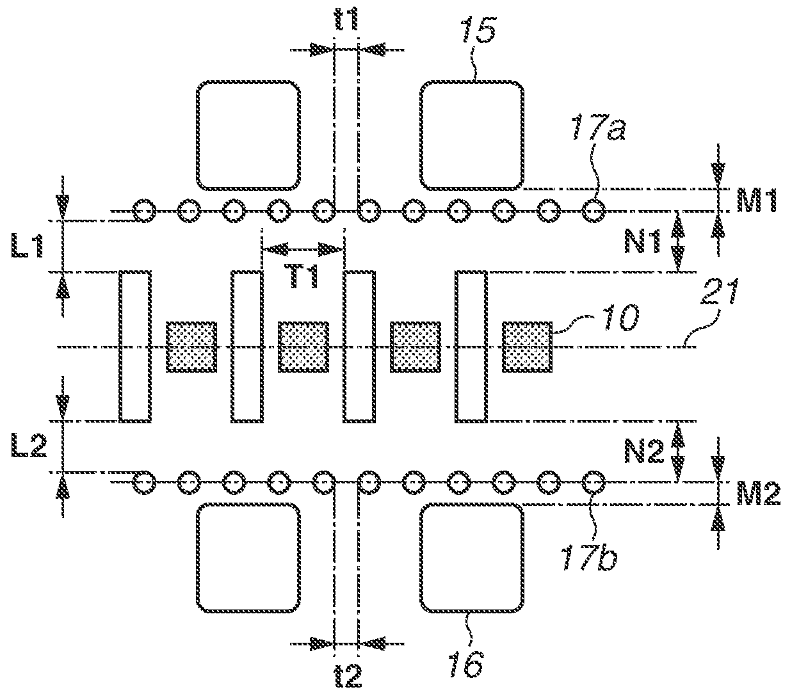
FIG. 5 is a schematic view illustrating a configuration of a part of the liquid ejection head illustrated in FIG. 3.

FIG. 5 is a schematic view illustrating a part of the liquid ejection head 1 illustrated in FIG. 3. As illustrated in FIG. 5, the first pillar structures 17*a* are arranged closer to the supply ports 15 than the intermediate position between the supply ports 15 and the pressure compartments 14 in the X direction. Specifically, a distance M1 in the X direction from the first pillar structures 17*a* to the supply ports 15 is smaller than a distance N1 in the X direction from the first pillar structures 17*a* to the flow path walls 11. A longest clearance t1 between the first pillar structures 17*a* in the Y direction is smaller than a shortest clearance L1 between the flow path walls 11 and the first pillar structures 17*a* in the X direction. A clearance d1 in the Y direction between the sidewall 13 of the common liquid chamber 12 and each of the first pillar structures 17*a* closest to the sidewall 13 is smaller than the shortest clearance L1 in the X direction between the flow path walls 11 and the first pillar structures 17*a*. The longest clearance t1 in the Y direction between the first pillar structures 17*a* is smaller than a clearance T1 in the Y direction between adjacent two of the flow path walls 11 constituting the corresponding pressure compartment of the pressure compartments 14. Here, the longest clearance t1 means the largest clearance of the clearances between the first pillar structures 17*a*. The shortest clearance L1 means a clearance between the first pillar structures 17*a* and the ends of the flow path wall 11 closest to the first pillar structures 17*a*. In the present exemplary embodiment, since the first pillar structures 17*a* are arranged at substantially equal intervals, the longest clearance t1 matches each of the clearances between the first pillar structures 17*a* adjacent to each other. Hereinafter, for convenience, the longest clearance t1 may be simply referred to as the clearance t1.

The second pillar structures 17*b* are disposed closer to the discharge ports 16 than the intermediate position between the discharge ports 16 and the pressure compartments 14 in the X direction. Specifically, a distance M2 in the X direction from the second pillar structures 17*b* to the discharge ports 16 is smaller than a distance N2 in the X direction from the second pillar structures 17*b* to the flow path walls 11. A longest clearance t2 between the second pillar structures 17*b* in the Y direction is smaller than a shortest clearance L2 between the flow path walls 11 and the second pillar structures 17*b* in the X direction. A clearance d2 in the Y direction between the sidewall 13 of the common liquid chamber 12 and each of the second pillar structures 17*b* closest to the sidewall 13 is smaller than the shortest clearance L2 in the X direction between the flow path walls 11 and the second pillar structures 17*b*.

The longest clearance t2 between the second pillar structures 17*b* in the X direction is smaller than the clearance T1 between adjacent two of the flow path walls 11 of each pressure compartment 14 in the X direction. Here, the longest clearance t2 means the largest clearance of the clearances between the second pillar structures 17*b*. The shortest clearance L2 means a clearance between the second pillar structures 17*b* and the ends of the flow path walls 11 closest to the second pillar structures 17*b*.

In the present exemplary embodiment, since the second pillar structures 17*b* are arranged at substantially equal intervals, the longest clearance t1 matches each of the clearances between the second pillar structures 17*b* adjacent to each other. Hereinafter, for convenience, the longest clearance t2 may be simply referred to as the clearance t2.

The clearance t1 between the first pillar structures 17*a* is smaller than an opening diameter C of each ejection nozzle 8. Similarly, the clearance t2 between the second pillar structures 17*b* is also smaller than the opening diameter C of each ejection nozzle 8. For example, as illustrated in FIG. 4A, when each ejection nozzle 8 has maximum opening and minimum opening sizes, the opening diameter C may be the maximum opening size.

Further, the clearance t1 may be substantially the same as the clearance t2. As a result, the number of the first pillar structures 17*a* and the number of the second pillar structures 17*b* can be the same as each other, and numbers and arrangements of pillar structures can be balanced between the liquid supply side and the liquid discharge side.

According to the liquid ejection head 1 of the present exemplary embodiment described above, the plurality of first pillar structures 17*a* arranged in line functions as a filter that catches foreign matter 22. The first pillar structures 17*a* are disposed on the supply ports 15 side, and are separated from the pressure compartments 14. For this reason, if the foreign matter 22 is caught on any of the first pillar structures 17*a*, the portion where the foreign matter 22 is caught serves as resistance to the fluid, but does not hinder movement of the liquid in an ejection operation in the corresponding pressure compartment 14. This effect will now be described in detail.

First, as a comparative example, a description will be given of a case where with the first pillar structures 17*a* disposed adjacent to the flow path walls 11, a portion on which the foreign matter 22 is caught interferes with movement of the liquid involved in an ejection operation.

Figure 6A:
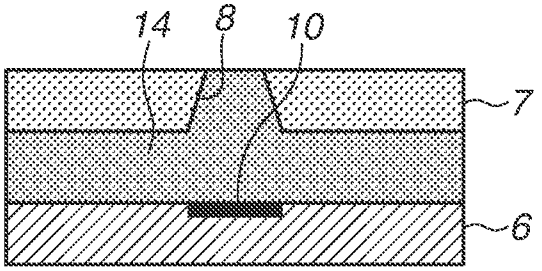
FIGS. 6A to 6F schematically illustrate movement of liquid involved in an ejection operation in the comparative example.
Figure 6B:
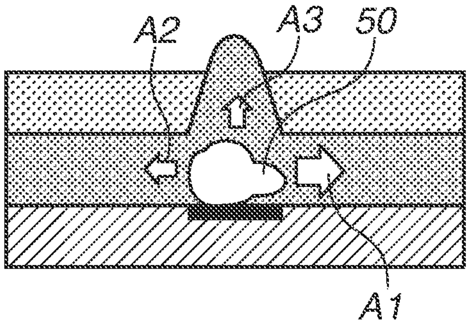
Figure 6C:
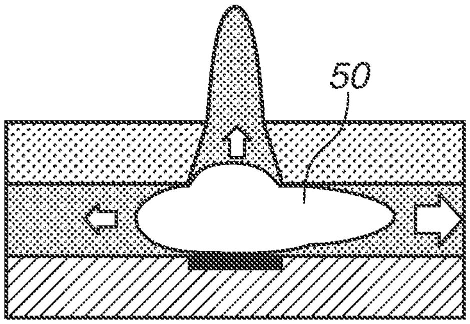
Figure 6D:
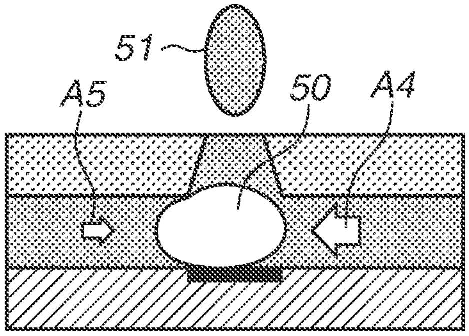
Figure 6E:
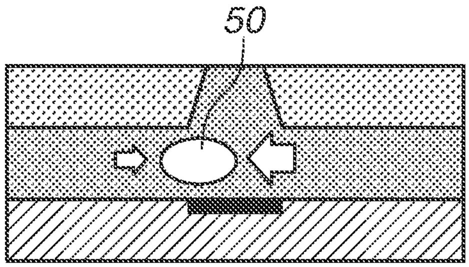
Figure 6F:
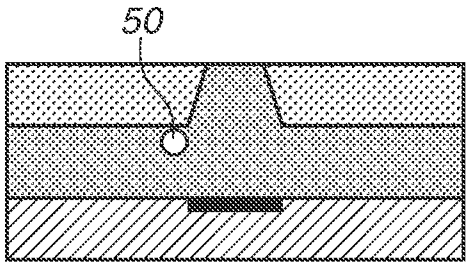

FIGS. 6A to 6F schematically illustrate movement of the liquid involved in an ejection operation in the comparative example. FIG. 6A illustrates a state before bubble formation. FIG. 6B illustrates a state at the start of the bubble formation. FIG. 6C illustrates a state of bubble growth. FIG. 6D illustrates a state at the time of liquid ejection. FIG. 6E illustrates a state at the time of bubble elimination. FIG. 6F illustrates a state at the completion of the bubble elimination. In FIGS. 6A to 6F, a portion where the foreign matter is caught exists on the left side to FIGS. 6A to 6F.

As illustrated in FIGS. 6A and 6B, with a drive current flowing through a corresponding energy generating element 10, bubble formation is started, and a bubble 50 is generated in the liquid in the pressure compartment 14. Then, as illustrated in FIG. 6C, the bubble 50 grows. In the process from the generation to the growth of the bubble 50, the liquid moves in directions from the inside to the outside of the pressure compartment 14 (arrows A1 and A2) and a direction toward the ejection nozzle 8 (arrow A3). Since resistance to the fluid is generated where the foreign matter is caught, the flow in the direction of the arrow A2 is slow and the flow rate thereof is small compared with the flow in the direction of the arrow A1. This causes the bubble 50 to grow largely in the direction of the arrow A1. Thereafter, as illustrated in FIGS. 6D to 6F, a liquid droplet 51 is ejected from the ejection nozzle 8, and at the same time, bubble elimination starts, making the bubble 50 small. In the process of liquid ejection and bubble elimination, the liquid moves in a direction from the outside to the inside of the pressure compartment 14 (arrows A4 and A5). Since the resistance to the fluid is generated where the foreign matter is caught, the flow in the direction of the arrow A5 is slow and the flow rate thereof is small compared with the flow in the direction of the arrow A4. Thus, in the process from bubble formation to bubble elimination, the bubble 50 grows rapidly and large on one side, and then rapidly becomes small. For this reason, the bubble 50 can be divided, or a small bubble can remain without being completely eliminated. This makes a liquid droplet (satellite droplet) and a fine mist-like liquid (ink mist) generated behind a main droplet smaller than the main droplet likely to be generated, degrading the liquid ejection performance.

Figure 7A:
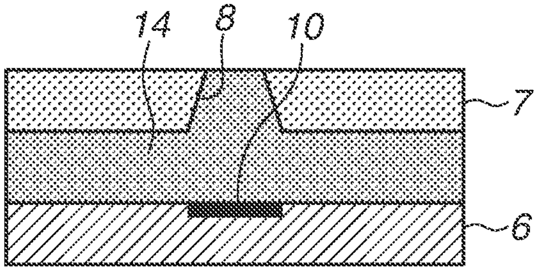
FIGS. 7A to 7F schematically illustrate a movement of liquid involved in the ejection operation of the liquid ejection head illustrated in FIG. 3.
Figure 7B:
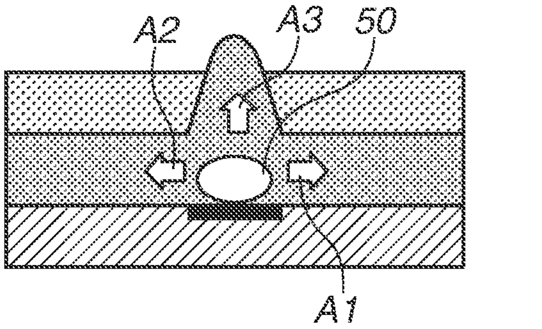
Figure 7C:
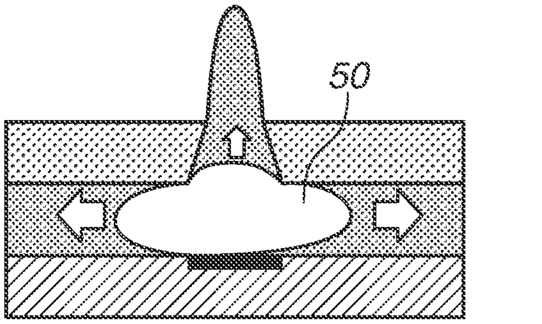
Figure 7D:
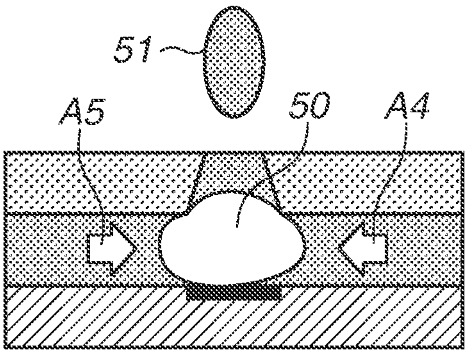
Figure 7E:
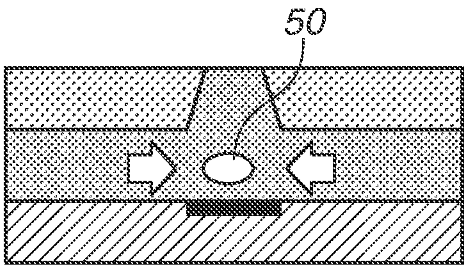
Figure 7F:
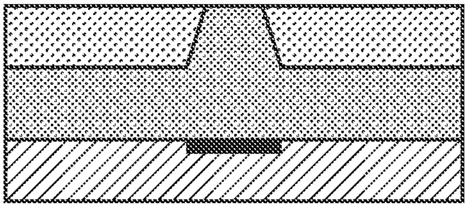

FIGS. 7A to 7F schematically illustrate movement of the liquid involved in the ejection operation of the liquid ejection head 1 according to the present exemplary embodiment. FIG. 7A illustrates a state before bubble formation. FIG. 7B illustrates a state at the start of the bubble formation. FIG. 7C illustrates a state of bubble growth. FIG. 7D illustrates a state at the time of liquid ejection. FIG. 7E illustrates a state at the time of bubble elimination. FIG. 7F illustrates a state at the completion of the bubble elimination. In FIGS. 7A to 7F, a portion where the foreign matter is caught exists on the left side to FIGS. 7A to 7F.

As illustrated in FIGS. 7A to 7C, in the process from the generation to the growth of the bubble 50, the liquid moves in the directions from the inside to the outside of the pressure compartment 14 (arrows A1 and A2) and the direction toward the ejection nozzle 8 (arrow A3). The flow in the direction of the arrow A1 and the flow in the direction of the arrow A2 have substantially the same flow speed and substantially the same flow rate because they are not easily affected by the resistance to the fluid in the portion where the foreign matter is caught. Thus, the bubble 50 rapidly grows by approximately the same amount in both directions of the arrows A1 and A2. In addition, as illustrated in FIGS. 7D to 7F, the liquid moves in a direction from the outside to the inside of the pressure compartment 14 (arrows A4 and A5) in the process of liquid ejection and bubble elimination. The flow in the direction of the arrow A4 and the flow in the direction of the arrow A5 have substantially the same flow speed and substantially the same flow rate because they are not easily affected by the resistance to the fluid in the portion where the foreign matter is caught. Thus, the bubble 50 rapidly shrinks by approximately the same amount in both directions of the arrows A4 and A5. In this way, in the process from bubble formation to bubble elimination, the bubble 50 rapidly grows to be large by substantially the same amount on both sides, and then rapidly becomes small. This makes it possible to reduce the division of the bubble 50 and the remaining of a small bubble. As a result, the occurrence of a satellite and ink mist can be reduced, making it possible to maintain the liquid ejection performance.

Further, with the liquid ejection head 1 according to the present exemplary embodiment, in addition to the above-described effects, the following effects are also achieved.

If the clearance t1 between the first pillar structures 17*a* is wider than the clearance L1 between the flow path wall 11 and the first pillar structures 17*a*, the foreign matter 22 that has passed between the first pillar structures 17*a* may be caught between the flow path walls 11 and the first pillar structures 17*a*. In this case, the resistance to the fluid where the foreign matter 22 is caught causes the movement of the liquid illustrated in FIGS. 6A to 6F, in which a satellite droplet and ink mist become likely to be generated. In the liquid ejection head 1 according to the present exemplary embodiment, the longest clearance t1 between the first pillar structures 17*a* is smaller than the shortest clearance L1 between the flow path walls 11 and the first pillar structures 17*a*. This configuration makes it possible to prevent the foreign matter 22 that has passed between the first pillar structures 17*a* from being caught between the flow path walls 11 and the first pillar structures 17*a*.

Further, if the clearance d1 between the first pillar structures 17*a* and the sidewall 13 is wider than the clearance between the flow path walls 11 and the first pillar structures 17*a*, the foreign matter 22 that has passed between the first pillar structures 17*a* and the sidewall 13 may be caught between the flow path walls 11 and the first pillar structures 17*a*. In this case, the resistance to the fluid where the foreign matter 22 is caught causes the movement of the liquid illustrated in FIGS. 6A to 6F, in which a satellite droplet and ink mist become likely to be generated. In the liquid ejection head 1 according to the present exemplary embodiment, the clearance d1 between the first pillar structures 17*a* and the sidewall 13 is smaller than the shortest clearance L1 between the flow path walls 11 and the first pillar structures 17*a*. This configuration makes it possible to prevent the foreign matter 22 that has passed between the first pillar structures 17*a* and the sidewall 13 from being caught between the flow path walls 11 and the first pillar structures 17*a*.

In addition, if the clearance between the first pillar structures 17*a* is wider than the clearance between adjacent two of the flow path walls 11 of the pressure compartments 14, the foreign matter 22 that has passed through the clearance between the first pillar structures 17*a* may block a clearance between the flow path walls 11. In this case, the blockage also causes the movement of the liquid involved in the ejection operation illustrated in FIGS. 6A to 6F, in which a satellite droplet and ink mist become likely to be generated. In the liquid ejection head 1 according to the present exemplary embodiment, the longest clearance t1 between the first pillar structures 17*a* is smaller than the clearance T1 between adjacent two of the flow path walls 11 constituting the corresponding pressure compartment 14. This configuration makes it possible to prevent the foreign matter 22 that has passed through between the first pillar structures 17*a* from blocking a clearance between the flow path walls 11.

The acts and effects related to the first pillar structures 17*a* have been described above. The second pillar structures 17*b* also achieves similar acts and effects to those by the first pillar structures 17*a*. The acts and effects achieved by the second pillar structure 17*b* will now be briefly described.

For example, the foreign matter 22 may be generated in the flow path in which the liquid that has passed through the first pillar structures 17*a* flows into the discharge ports 16 via the flow path walls 11 and the second pillar structures 17*b*. The plurality of second pillar structures 17*b* arranged in line functions as a filter for catching the foreign matter 22.

Similarly to the filter that is the first pillar structures 17*a*, in the filter that is the second pillar structures 17*b*, if the portion where the foreign matter 22 is caught is close to any of the pressure compartments 14, that causes the movement of the liquid illustrated in FIGS. 6A to 6F, in which a satellite droplet and ink mist become likely to be generated. In the present exemplary embodiment, the second pillar structures 17*b* are disposed on the discharge ports 16 side, and are separated from the pressure compartments 14. For this reason, if the foreign matter 22 is caught between the second pillar structures 17*b*, the portion where the foreign matter 22 is caught becomes the resistance to the fluid, but obstruction of the movement of the liquid involved in the ejection operation in the corresponding pressure compartment 14 can be reduced.

The longest clearance t2 between the second pillar structures 17*b* is smaller than the shortest clearance L2 between the flow path walls 11 and the second pillar structures 17*b*. This configuration makes it possible to prevent the foreign matter 22 that has passed between the second pillar structures 17_b_ from being caught between the flow path walls 11 and the second pillar structures 17_b_.

Further, the clearance d2 between the second pillar structures 17_b_ and the sidewall 13 is smaller than the shortest clearance L2 between the flow path walls 11 and the second pillar structures 17_b_. This configuration makes it possible to prevent the foreign matter 22 that has passed between the second pillar structures 17_b_ and the sidewall 13 from being caught between the flow path walls 11 and the second pillar structures 17_b_.

Furthermore, since the longest clearance t2 between the second pillar structures 17_b_ is smaller than the clearance T1 between adjacent two of the flow path walls 11 constituting the corresponding pressure compartment 14, making it possible to prevent the foreign matter 22 that has passed through the clearance between the second pillar structures 17_b_ from blocking a clearance between the flow path walls 11.

On the other hand, depending on the arrangement of the first pillar structures 17_a_ and the second pillar structures 17_b_, the pillar structures 17_a_ and 17_b_ may influence the liquid ejection operation to some extent. For example, if the positional relationship between the pressure compartments 14 and the first pillar structures 17_a_ is different from the positional relationship between the pressure compartments 14 and the second pillar structures 17_b_, that may cause the movement of the liquid illustrated in FIGS. 6A to 6F. Thus, it is desirable that the first pillar structures 17_a_ and the second pillar structures 17_b_ be arranged line-symmetrically with respect to the center line (same as the center line 21) of the row of the plurality of flow path walls 11.

Example

An example of the liquid ejection head 1 according to the present exemplary embodiment will now be described. In the example, the number of the ejection nozzles 8 is 500, which are arranged in line in the Y direction at intervals of 42 micrometers (μm). The diameter of each ejection nozzle 8 is 20 μm. The length of each flow path wall 11 in the Y direction is 16 μm, and the length thereof in the X direction is 54 μm. The length of the common liquid chamber 12 in the Y direction is 21,011 μm, and the length thereof in the X direction is 240 μm. The ejection nozzles 8 are arranged at the center of the common liquid chamber 12.

The number of the supply ports 15 is 250, which are arranged in line at intervals of 84 μm in the Y direction. Each supply port 15 has a substantially square shape the size of 50 μm×50 μm. The distance between the center of the supply ports 15 and the center line 21 is 80 μm. The number of the discharge ports 16 is 250, which are arranged in line at intervals of 84 μm in the Y direction. Each discharge port 16 has a substantially square shape the size of 50 μm×50 μm. The distance between the discharge ports 16 and the center line 21 is 80 μm. The number of the first pillar structures 17_a_ is 1,000, which are arranged in line at intervals of 21 μm. The diameter of each first pillar structure 17_a_ is 10 μm. The distance from the center of the first pillar structures 17_a_ to the center line 21 is 45 μm. Similarly to the first pillar structures 17_a_, the number of the second pillar structures 17_b_ is 1,000, which are arranged in line at intervals of 21 μm. The diameter of each second pillar structure 17_b_ is 10 μm. The distance from the center of the second pillar structures 17_b_ to the center line 21 is 45 μm.

The clearance t1 between the first pillar structures 17_a_ and the clearance t2 between the second pillar structures 17_b_ are both 11 μm. The clearance d1 between the sidewall 13 of the common liquid chamber 12 and the first pillar structures 17_a_ and the clearance d2 between the sidewall 13 of the common liquid chamber 12 and the second pillar structures 17_b_ are both 11 μm. The shortest clearance L1 between the flow path walls 11 and the first pillar structures 17_a_ and the shortest clearance L2 between the flow path walls 11 and the second pillar structures 17_b_ are both 13 μm.

Using the liquid ejection head 1 with the above-described configuration, printing was performed on about 1,000 sheets of A3 recording medium P, and the inside of the ejection port member 7 was checked. Although the foreign matter 22 was caught between the first pillar structures 17_a_, it was confirmed that favorable printing was performed.

Comparative Example

Figure 8:
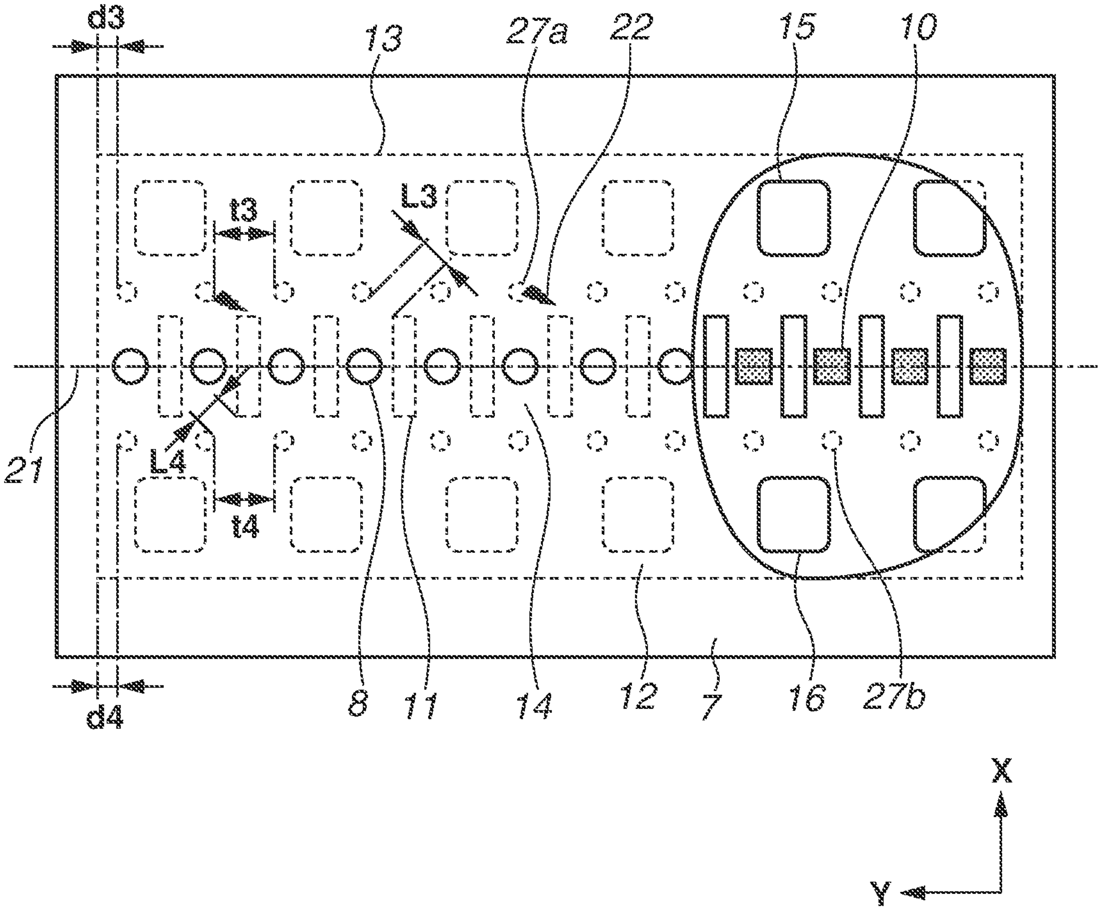
FIG. 8 schematically illustrates a configuration of a liquid ejection head as a comparative example.

FIG. 8 schematically illustrates a configuration of a liquid ejection head according to a comparative example. In FIG. 8, the X direction corresponds to the main scanning direction, and the Y direction corresponds to the sub-scanning direction. As in FIG. 3, in FIG. 8, the internal structure of the liquid ejection head as viewed from the ejection port member 7 side is indicated by broken lines, and a part of the ejection port member 7 is cut away so that the internal structure can be seen.

As illustrated in FIG. 8, the liquid ejection head of the comparative example includes the ejection nozzles 8, the energy generating elements 10, the common liquid chamber 12, the pressure compartments 14, the supply ports 15, the discharge ports 16, first pillar structures 27_a_, and second pillar structures 27_b_. The liquid ejection head of the comparative example has basically the same configuration as the liquid ejection head 1 does as illustrated in FIG. 3 except for the first pillar structures 27_a_ and the second pillar structures 27_b_.

The ejection nozzle 8, the flow path walls 11, the supply ports 15, and the discharge ports 16 are arranged in the same manner as in the above-described exemplary embodiment. The length of the common liquid chamber 12 in the Y direction is 20,994 μm, and the length thereof in the X direction is 240 μm. The ejection nozzles 8 are arranged at the center of the common liquid chamber 12. The distance between the center of the supply ports 15 and the center line 21 is 80 μm. The distance between the discharge ports 16 and the center line 21 is also 80 μm.

The number of the first pillar structures 27_a_ is 500, which are arranged in line at intervals of 42 μm.

The diameter of each first pillar structure 27_a_ is 10 μm. The distance from the center of the first pillar structures 17_a_ to the center line 21 is 42 μm. Similarly to the first pillar structures 27_a_, the number of the second pillar structures 27_b_ is 500, which are arranged in line at intervals of 42 μm. The diameter of each second pillar structure 27_b_ is 10 μm. The distance from the center of the second pillar structures 27_b_ to the center line 21 is 42 μm.

Both a clearance t3 between the first pillar structures 27_a_ and a clearance t4 between the second pillar structures 27_b_ are 32 μm. A clearance d3 between the sidewall 13 of the common liquid chamber 12 and the first pillar structures 27_a_ and a clearance d4 between the sidewall 13 of the common liquid chamber 12 and the second pillar structures 27_b_ are both 13 μm. A shortest clearance L3 between the flow path walls 11 and the first pillar structures 27_a_ and a shortest clearance L4 between the flow path walls 11 and the second pillar structures 27_b_ are both 13 μm.

Using the liquid ejection head of the above-described comparative example, printing was performed on about 1,000 sheets of A3 recording medium P, and the inside of the ejection port member 7 was checked. The foreign matter 22 was caught between the first pillar structures 27*a* and the sidewall 13. When the printed matter was checked, some portions where the image quality was deteriorated were found. The portions where the image quality was deteriorated corresponded to the ejection nozzle 8 close to the portion where the foreign matter 22 was caught.

Figure 9:
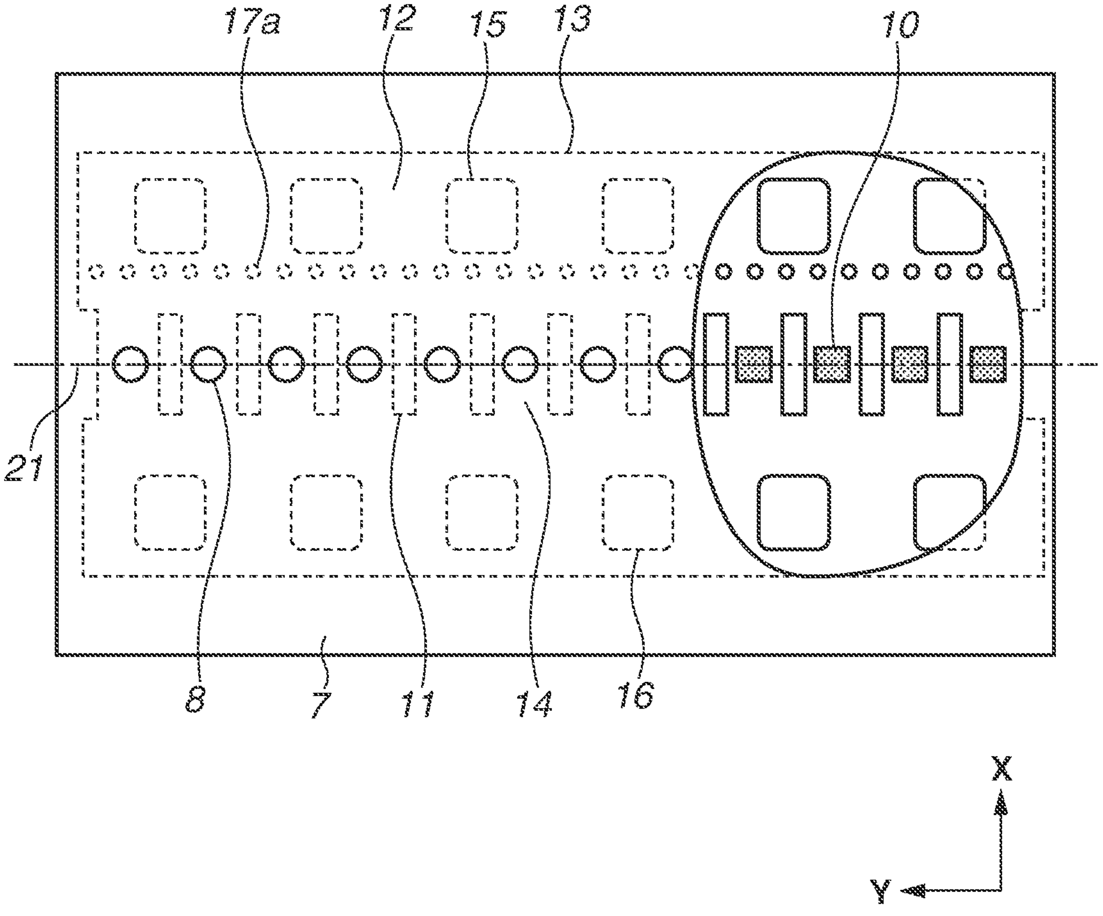
FIG. 9 is a schematic view illustrating a configuration of a liquid ejection head according to a second exemplary embodiment of the present disclosure.

A second exemplary embodiment will be described. FIG. 9 is a schematic view illustrating a configuration of a liquid ejection head 1 according to the second exemplary embodiment of the present disclosure.

In FIG. 9, an X direction corresponds to the main scanning direction, and a Y direction corresponds to the sub-scanning direction. Similarly to FIG. 3, in FIG. 9, the internal configuration of the liquid ejection head 1 as viewed from the ejection port member 7 side is indicated by broken lines, and a part of the ejection port member 7 is cut away so that the internal structure can be seen.

The liquid ejection head 1 according to the present exemplary embodiment is the same as that of the first exemplary embodiment except that the second pillar structures 17*b* are not provided. The first pillar structures 17*a* are arranged in the same manner as in the first exemplary embodiment, with which the effects described in the first exemplary embodiment are achieved.

Also in the liquid ejection head 1 of the present exemplary embodiment, respective constituent elements are configured in the same manner as the corresponding constituent elements in the example of the liquid ejection head according to the first exemplary embodiment described above. With this configuration, printing was performed on about 1,000 sheets of A3 recording medium P. As in the first exemplary embodiment, it was confirmed that favorable printing was performed.

Further, with a structure in which only the second pillar structures 17*b* were arranged on the discharge ports 16 side without the first pillar structures 17*a* being provided, the check was performed under the same condition as described above, it was found that the foreign matter 22 blocked one ejection nozzle 8, which resulted in an ejection failure with a deteriorated image quality.

Figure 10:
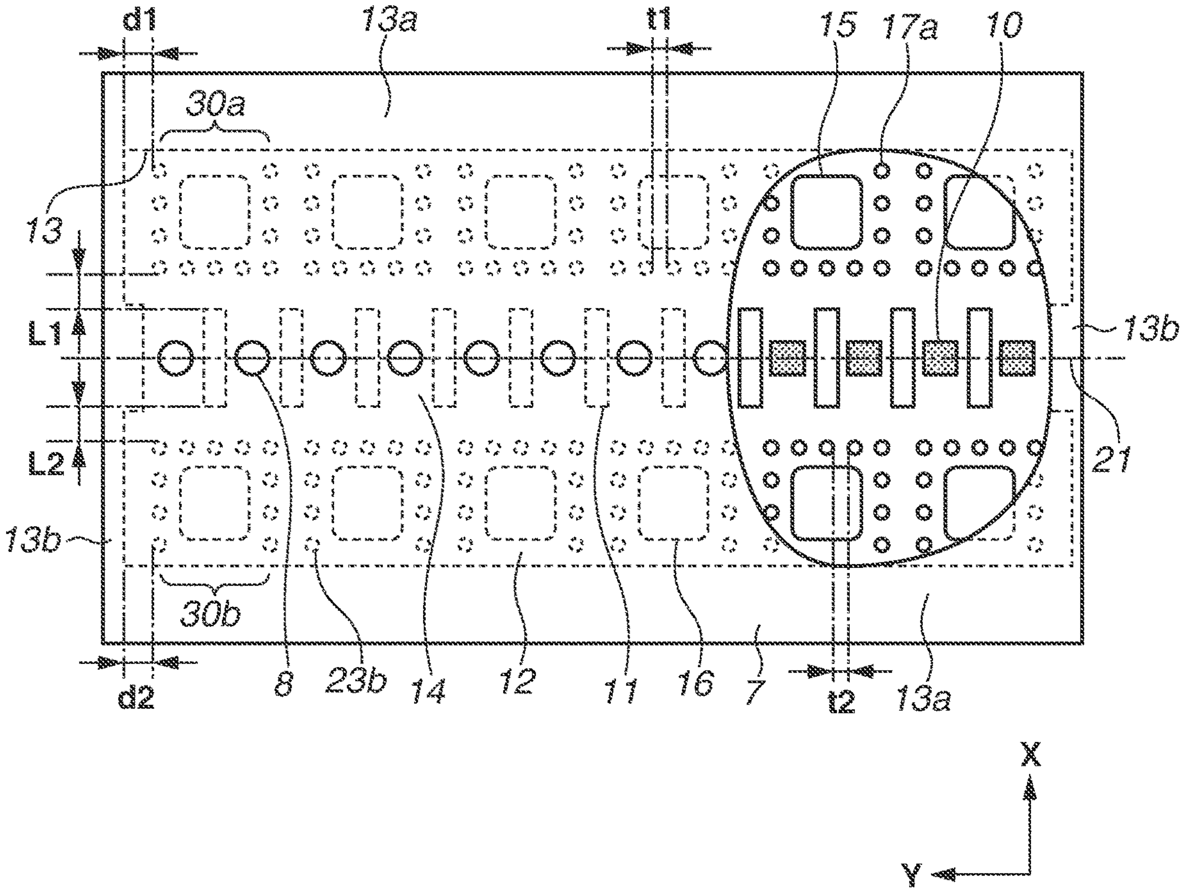
FIG. 10 is a schematic view illustrating a configuration of a liquid ejection head according to a third exemplary embodiment of the present disclosure.

A third exemplary embodiment will be described. FIG. 10 is a schematic view illustrating a configuration of a liquid ejection head 1 according to the third exemplary embodiment of the present disclosure. In FIG. 10, an X direction corresponds to the main scanning direction, and a Y direction corresponds to the sub-scanning direction. Similarly to FIG. 3, in FIG. 10, the internal configuration of the liquid ejection head 1 as viewed from the ejection port member 7 side is indicated by broken lines, and a part of the ejection port member 7 is cut away so that the internal structure can be seen.

The liquid ejection head 1 according to the present exemplary embodiment is the same as that of the first exemplary embodiment except for the arrangements of first pillar structures 17*a* and second pillar structures 17*b*. Here, in order to avoid duplication of description, a description of the same configuration as that in the first exemplary embodiment will be omitted.

In a region on the supply ports 15 side of a common liquid chamber 12, a sidewall 13 includes a first sidewall 13*a* extending in the Y direction (first direction). A plurality of supply ports 15 is arranged in line in the Y direction adjacent to the first sidewall 13*a*. A plurality of first pillar structures 17*a* constitutes a plurality of pillar structure lines 30*a* each provided to the corresponding supply port of the plurality of supply ports 15. Each pillar structure line 30*a* is formed in a C-like shape surrounding the corresponding supply port 15. Each supply port 15 is defined by the corresponding pillar structure line 30*a* having the C-like shape and the first sidewall 13*a*. A longest clearance t1, a shortest clearance L1, and a clearance d1 satisfy the conditions described in the first exemplary embodiment.

In a region on the discharge ports 16 side of the common liquid chamber 12, the sidewall 13 includes another first sidewall 13*a* extending in the Y direction (first direction). A plurality of discharge ports 16 is arranged in line in the Y direction adjacent to the other first sidewall 13*a*. A plurality of second pillar structures 17*b* constitutes a plurality of pillar structure lines 30*b* each provided to the corresponding discharge port of the plurality of discharge ports 16. Each pillar structure line 30*b* is formed in the C-like shape surrounding the corresponding discharge port 16. Each discharge port 16 is defined by the corresponding pillar structure line 30*b* having the C-like shape and the first sidewall 13*a*. A longest clearance t2, a shortest clearance L2, and a clearance d2 satisfy the conditions described in the first exemplary embodiment.

Although not illustrated in FIG. 10, a clearance T1, a distance M1, a distance M2, a distance N1, a distance N2, and an opening diameter C of each ejection nozzle 8 also satisfy the conditions described in the first exemplary embodiment.

The liquid ejection head 1 according to the present exemplary embodiment also achieves the effects described in the first exemplary embodiment.

A result of printing on recording media P using the liquid ejection head 1 according to the present exemplary embodiment will be briefly described.

In the pillar structure lines 30*a* having the C-like shape, the first pillar structures 17*a* are arranged around the supply ports 15 at intervals of 20 μm. The distance from the edge of the supply ports 15 to the first pillar structures 17*a* is 3 μm. The diameter of each first pillar structure 17*a* is 10 μm. The clearance t1 between the first pillar structures 17*a* is 10 μm. The shortest clearance L1 between the flow path walls 11 and the first pillar structures 17*a* is 15 μm.

In the pillar structure lines 30*b* having the C-like shape, the second pillar structures 17*b* are arranged around the discharge ports 16 at intervals of 20 μm. The length from the edge of the discharge ports 16 to the second pillar structures 17*b* is 3 μm. The diameter of each second pillar structure 17*b* is 10 μm. The clearance t2 between the second pillar structures 17*b* is 10 μm. The shortest clearance L2 between the flow path walls 11 and the second pillar structures 17*b* is 15 μm.

Other than the above, the configuration is the same as that in the example described in the first exemplary embodiment. When printing was performed on about 1,000 sheets of A3 recording medium P using the liquid ejection head 1 with the configuration, it was confirmed that favorable printing was performed.

Figure 11:
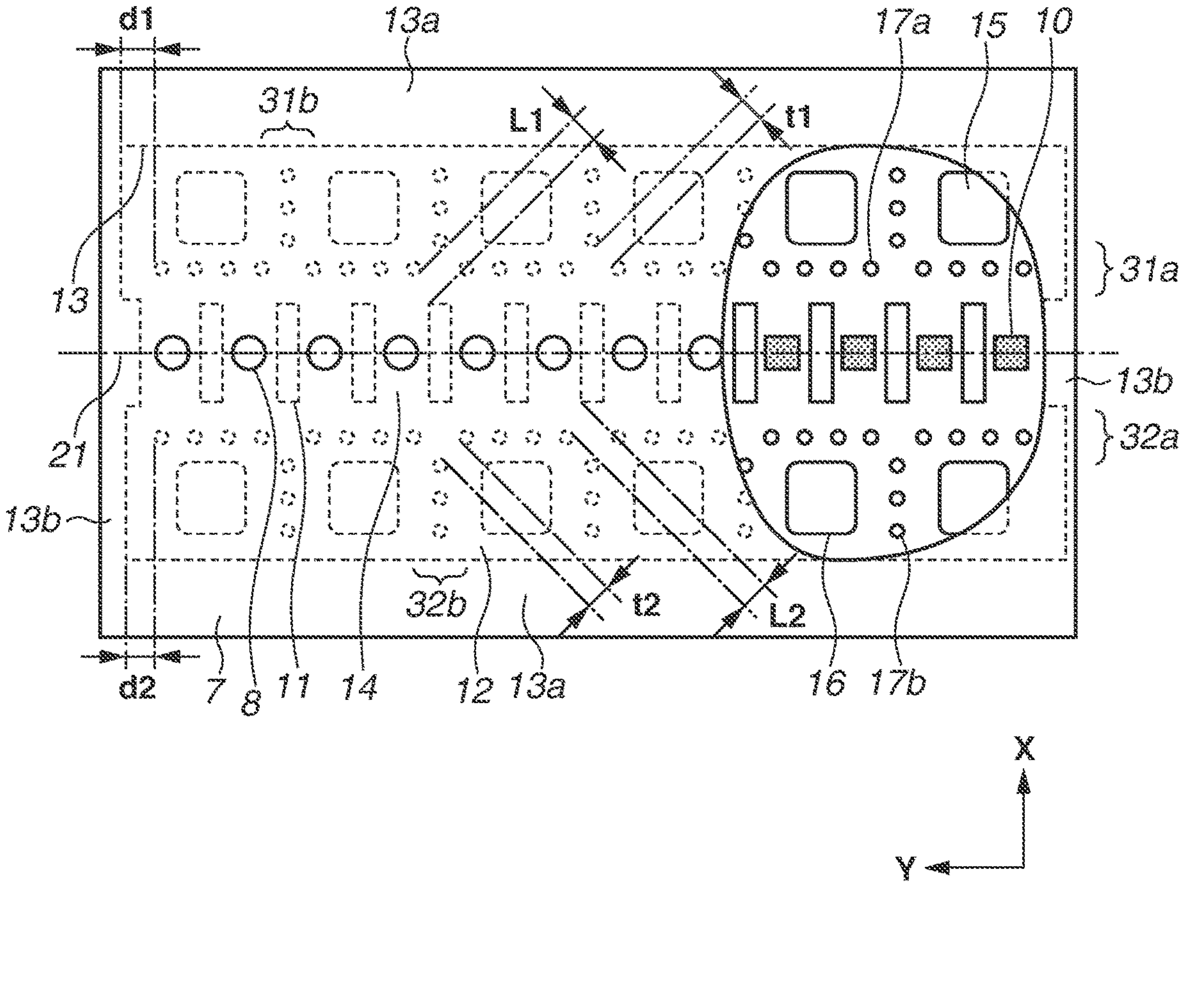
FIG. 11 is a schematic view illustrating a configuration of a liquid ejection head according to a fourth exemplary embodiment of the present disclosure.

A fourth exemplary embodiment will be described. FIG. 11 is a schematic view illustrating a configuration of a liquid ejection head 1 according to the fourth exemplary embodiment of the present disclosure. In FIG. 11, an X direction corresponds to the main scanning direction, and a Y direction corresponds to the sub-scanning direction. Similarly to FIG. 3, in FIG. 11, the internal configuration of the liquid ejection head 1 as viewed from the ejection port member 7 side is indicated by broken lines, and a part of the ejection port member 7 is cut away so that the internal structure can be seen.

The liquid ejection head 1 according to the present exemplary embodiment is the same as that of the first exemplary embodiment except for the arrangements of first pillar structures 17*a* and second pillar structures 17*b*. Here, in order to avoid duplication of description, a description of the same configuration as that of the first exemplary embodiment will be omitted.

In a region on the supply ports 15 side of a common liquid chamber 12, a sidewall 13 includes a first sidewall 13*a* extending in the Y direction (first direction) and two second sidewalls 13*b* extending in the X direction (second direction) from both ends of the first sidewall 13*a* and parallel to each other. The plurality of supply ports 15 is arranged in line in the Y direction adjacent to the first sidewall 13*a*. The plurality of first pillar structures 17*a* constitutes a first pillar structure line 31*a* extending in the Y direction and a plurality of second pillar structure lines 31*b* arranged between the supply ports 15 and extending in the X direction. The plurality of supply ports 15 is defined by the first pillar structure line 31*a*, the plurality of second pillar structure lines 31*b*, the first sidewall 13*a*, and the two second sidewalls 13*b*. A longest clearance t1, a shortest clearance L1, and a clearance d1 satisfy the conditions described in the first exemplary embodiment.

In a region on the discharge ports 16 side of the common liquid chamber 12, the sidewall 13 includes another first sidewall 13*a* extending in the Y direction (first direction) and the two second sidewalls 13*b* extending in the X direction (second direction) from both ends of the other first sidewall 13*a* and parallel to each other. The plurality of discharge ports 16 is arranged in line in the Y direction adjacent to the other first sidewall 13*a*. The plurality of second pillar structures 17*b* constitutes a first pillar structure line 32*a* extending in the Y direction and a plurality of second pillar structure lines 32*b* arranged between the discharge ports 16 and extending in the X direction. The plurality of discharge ports 16 is defined by the first pillar structure line 32*a*, the plurality of second pillar structure lines 32*b*, the other first sidewall 13*a*, and the two second sidewalls 13*b*. A longest clearance t2, a shortest clearance L2, and a clearance d2 satisfy the conditions described in the first exemplary embodiment.

Although not illustrated in FIG. 11, a clearance T1, a distance M1, a distance M2, a distance N1, a distance N2, and an opening diameter C of each ejection nozzle 8 also satisfy the conditions described in the first exemplary embodiment.

The liquid ejection head 1 according to the present exemplary embodiment also achieves the effects described in the first exemplary embodiment.

A result of printing on recording media P using the liquid ejection head 1 according to the present exemplary embodiment will be briefly described.

The diameter of each first pillar structure 17*a* is 10 μm. The interval between the first pillar structures 17*a* is 20 μm, and the clearance t1 is 10 μm. The clearance d1 between the first pillar structures 17*a* and the sidewall 13 is 10 μm. The shortest clearance L1 between the flow path walls 11 and the first pillar structures 17*a* is 15 μm.

The diameter of each second pillar structure 17*b* is 10 μm. The interval between the second pillar structures 17*b* is 20 μm, and the clearance t2 is 10 μm. The clearance d2 between the second pillar structures 17*b* and the sidewall 13 is 10 μm. The shortest clearance L2 between the flow path walls 11 and the second pillar structures 17*b* is 15 μm.

Other than the above, the configuration is the same as that in the example described in the first exemplary embodiment. When printing was performed on about 1,000 sheets of A3 recording medium P using the liquid ejection head 1 with the configuration, it was confirmed that favorable printing was performed.

Figure 12:
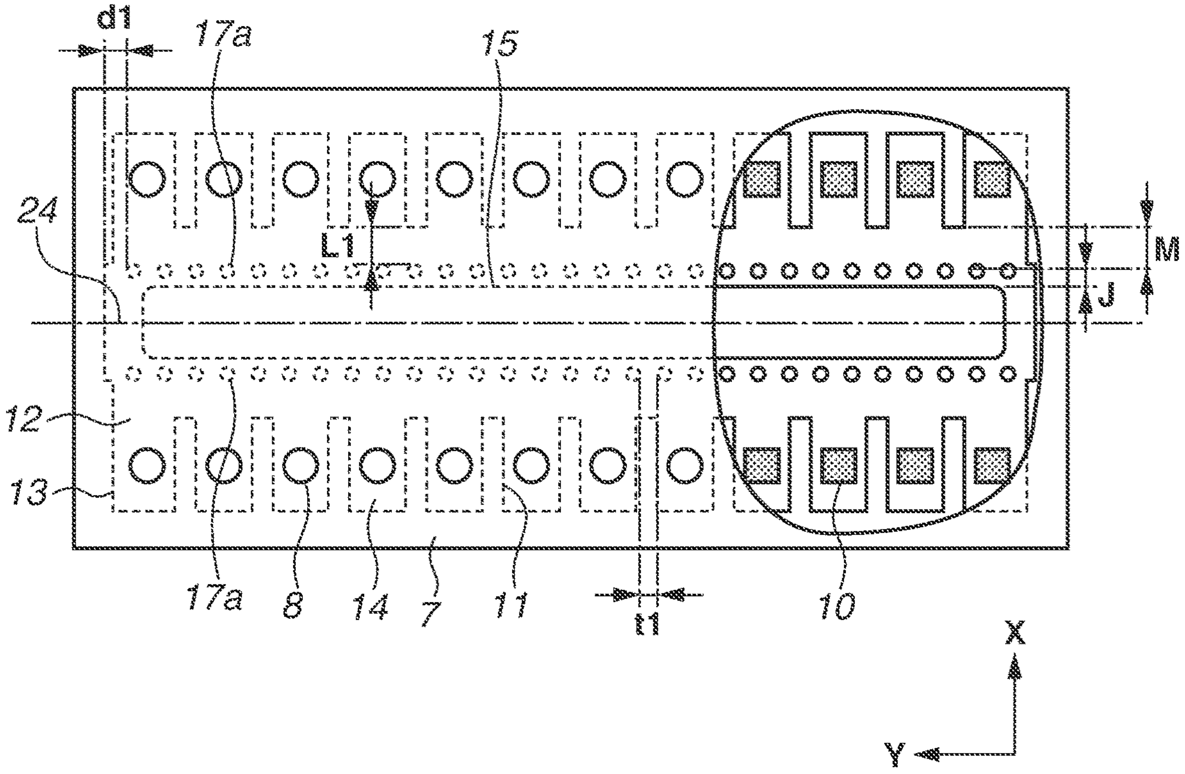
FIG. 12 is a schematic view illustrating a configuration of a liquid ejection head according to a fifth exemplary embodiment of the present disclosure.

A fifth exemplary embodiment will be described. FIG. 12 is a schematic view illustrating a configuration of a liquid ejection head 1 according to the fifth exemplary embodiment of the present disclosure. In FIG. 12, an X direction corresponds to the main scanning direction, and a Y direction corresponds to the sub-scanning direction. Similarly to FIG. 3, in FIG. 12, the internal configuration of the liquid ejection head 1 as viewed from the ejection port member 7 side is indicated by a broken line, and a part of the ejection port member 7 is cut away so that the internal structure can be seen.

In the liquid ejection head 1 according to the present exemplary embodiment, two ejection nozzle arrays in which a plurality of ejection nozzles 8 is arranged in line in a first direction (Y direction) are arranged in parallel, and one supply port 15 is provided in the center of a common liquid chamber 12. The supply port 15 has a substantially rectangular shape which is long in the first direction (Y direction), and first pillar structures 17*a* and pressure compartments 14 are provided on both sides of the supply port 15.

Each pressure compartment 14 is provided to the corresponding ejection nozzle of the ejection nozzles 8 and is defined by two flow path walls 11 parallel to each other. An energy generating element 10 is provided to the corresponding pressure compartment of the pressure compartments 14 at a position facing the corresponding ejection nozzle 8. Each flow path wall 11 is joined to a sidewall 13 of the common liquid chamber 12. Adjacent two of the flow path walls 11 and the sidewall 13 of the common liquid chamber 12 form one pressure compartment 14 that is a closed space in a U shape. Each pressure compartment 14 is open toward the supply port 15.

The first pillar structures 17*a* are disposed closer to the supply port 15 than the intermediate position between the supply port 15 and the pressure compartments 14. The first pillar structures 17*a* are arranged in line in the first direction (Y direction). The first pillar structures 17*a* and the supply port 15 are provided so as to be line-symmetrical with respect to a center line 24 running through the center of the supply port 15. A distance J from the center line of the row of the first pillar structures 17*a* to the supply port 15 is shorter than a distance M from the center line of the row of the first pillar structures 17*a* to the flow path walls 11. The distance J corresponds to the distance M1, and the distance M corresponds to the distance N1. A longest clearance t1, a shortest clearance L1, and a clearance d1 satisfy the conditions described in the first exemplary embodiment. Although not illustrated in FIG. 11, a clearance T1 and an opening diameter C of each ejection nozzle 8 also satisfy the conditions described in the first exemplary embodiment.

The liquid ejection head 1 according to the present exemplary embodiment also achieves the effects described in the first exemplary embodiment.

A result of printing on recording media P using the liquid ejection head 1 according to the present exemplary embodiment will be briefly described.

On one side of the center line 24, the number of the ejection nozzles 8 is 500, which are arranged in line in the Y direction at intervals of 42 μm. Similarly, on the other side, the number of the ejection nozzle 8 is also 500, which are arranged in line in the Y direction at intervals of 42 μm. The distance from the center line 24 to the ejection nozzles 8 is 120 μm. The diameter of each ejection nozzle 8 is 20 μm.

The size of the supply port 15 is 40 μm (X direction)×20,958 μm (Y direction). The size of the common liquid chamber 12 is 145 μm (X direction)×21,011 μm (Y direction). The length of each flow path wall 11 in the Y direction is 16 μm, and the length thereof in the X direction is 54 μm. The flow path walls 11 are arranged at intervals of 42 μm. The distance from the center of each ejection nozzle 8 to the corresponding flow path walls 11 is 13 μm.

On one side of the supply port 15, the number of the first pillar structures 17*a* is 1,000, which are arranged in line at intervals of 21 μm. On the other side of the supply port 15, the number of the first pillar structures 17*a* is 1,000, which are arranged in line at intervals of 21 μm. The diameter of each first pillar structure 17*a* is 10 μm. The distance from the center of the first pillar structure 17*a* to the center line 24 is 60 μm. A clearance t1 between the first pillar structures 17*a* is 11 μm, and a clearance d1 between the sidewall 13 of the common liquid chamber 12 and the first pillar structures 17*a* is also 11 μm. A shortest clearance L1 between the flow path walls 11 and the first pillar structures 17*a* is 28 μm.

Using the liquid ejection head 1 with the above-described configuration, printing was performed on about 1,000 sheets of A3 recording medium P, and then the inside of the ejection port member 7 was checked. Although the foreign matter 22 was caught between the first pillar structures 17*a*, it was confirmed that favorable printing was performed.

Each of the first to fifth exemplary embodiments described above is an example of the present disclosure, and the constituent elements described in each exemplary embodiment can be appropriately changed. For example, in the first exemplary embodiment, the third exemplary embodiment, and the fourth exemplary embodiment, the second pillar structures 17*b* may be removed.

Other Exemplary Embodiment

A liquid ejection head according to another exemplary embodiment of the present disclosure will be described. Here, a configuration of the liquid ejection head according to the present exemplary embodiment will be described with reference to FIGS. 1 and 3, FIGS. 4A and 4B, and FIG. 5.

The liquid ejection head includes ejection nozzles 8, heating resistance elements serving as energy generating elements 10, pressure compartments 14, supply ports 15, and a plurality of pillar structures as first pillar structures 17*a*. Each pressure compartment 14 includes a first flow path wall (11) and a second flow path wall (11) that are parallel to each other, and liquid flows between the first and second flow path walls (11). Each ejection nozzle 8 communicates with the corresponding pressure compartment 14. Each heating resistance element (10) is provided between the corresponding first and second flow path walls (11), and ejects the liquid from the corresponding ejection nozzle 8 by generating a bubble. The supply ports 15 supply the liquid to the pressure compartments 14. The plurality of pillar structures (17*a*) is provided between the supply ports 15 and the pressure compartments 14.

Each pressure compartment 14 has a first opening and a second opening opposed to the first opening. In bubble formation, the liquid flows between the first and second flow path walls (11) out from both sides of the first and second openings. In bubble elimination, the liquid between the first and second flow path walls (11) flows in from both the first and second openings. The plurality of pillar structures (17*a*) is a filter that catches foreign matter contained in the liquid. The plurality of pillar structures (17*a*) is configured such that the outflow amount and the outflow speed of the liquid in bubble formation are substantially the same on both sides, and the inflow amount and the inflow speed of the liquid in bubble elimination are substantially the same on both sides without foreign matter being caught. In addition, the plurality of pillar structures (17*a*) is configured such that the outflow amount and the outflow speed of the liquid in bubble formation are substantially the same on both sides, and the inflow amount and the inflow speed of the liquid in bubble elimination are substantially the same on both sides even with foreign matter caught.

The liquid ejection head according to the present exemplary embodiment also achieves the same effects as those of the first exemplary embodiment.

According to the present disclosure, deterioration in liquid ejection performance can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-181661, filed Nov. 14, 2022, which is hereby incorporated by reference herein in its entirety.

What is claimed is:

1. A liquid ejection head comprising:

a plurality of ejection nozzles configured to eject liquid;

a plurality of pressure compartments which each communicate with a corresponding ejection nozzle of the plurality of ejection nozzles and are each combined with an energy generating element configured to generates ejection energy for ejecting the liquid;

at least one supply port configured to supply the liquid to the plurality of pressure compartments; and a plurality of first pillar structures arranged between the at least one supply port and the plurality of pressure compartments, wherein the plurality of pressure compartments is each defined by a plurality of flow path walls arranged in line and parallel to each other, wherein a liquid flow path is formed and configured to allow the liquid to flow through the liquid flow path from the at least one supply port via the plurality of first pillar structures into the plurality of pressure compartments, and wherein a longest clearance between the plurality of first pillar structures is smaller than a shortest clearance between the plurality of flow path walls and the plurality of first pillar structures.

2. The liquid ejection head according to claim 1, wherein the longest clearance between the plurality of first pillar structures is smaller than an opening diameter of each of the plurality of ejection nozzles.

3. The liquid ejection head according to claim 1, wherein the plurality of flow path walls is arranged at predetermined intervals, and the longest clearance between the plurality of first pillar structures is smaller than a clearance between adjacent two of the plurality of flow path walls.

4. The liquid ejection head according to claim 1, wherein the plurality of first pillar structures is arranged in line at predetermined intervals, and wherein a distance from a row of the plurality of first pillar structures to the at least one supply port is shorter than a distance from the row of the plurality of first pillar structures to the plurality of flow path walls.

5. The liquid ejection head according to claim 1, further comprising a sidewall surrounding the at least one supply port, the plurality of first pillar structures, and the plurality of pressure compartments, wherein a clearance between a first pillar structure adjacent to the sidewall of the plurality of first pillar structures and the sidewall is smaller than the shortest clearance between the plurality of flow path walls and the plurality of first pillar structures.

6. The liquid ejection head according to claim 5, wherein the sidewall includes a first sidewall extending in a first direction, wherein the at least one supply port comprises a plurality of supply ports arranged in line in the first direction adjacent to the first sidewall, wherein the plurality of first pillar structures forms a plurality of pillar structure lines each provided to a corresponding supply port of the plurality of supply ports, and wherein the plurality of pillar structure lines is each formed in a C-like shape so as to surround the corresponding supply port, and the corresponding supply port is defined by the pillar structure line having the C-like shape and the first sidewall.

7. The liquid ejection head according to claim 5, wherein the sidewall includes a first sidewall extending in a first direction and two second sidewalls parallel to each other and extending from both ends of the first sidewall in a second direction intersecting with the first direction, wherein the at least one supply port comprises a plurality of supply ports arranged in line in the first direction adjacent to the first sidewall, wherein the plurality of first pillar structures includes a first pillar structure line extending in the first direction and a plurality of second pillar structure lines arranged between the plurality of supply ports and extending in the second direction, and wherein the plurality of supply ports is defined by the first pillar structure line, the plurality of second pillar structure lines, the first sidewall, and the two second sidewalls.

8. The liquid ejection head according to claim 1, wherein the at least one supply port is a supply port extending in a first direction, and the plurality of ejection nozzles, the plurality of pressure compartments, and the plurality of first pillar structures are arranged on both sides of the at least one supply port.

9. The liquid ejection head according to claim 1, further comprising:

at least one discharge port configured to discharge the liquid; and a plurality of second pillar structures arranged between the at least one discharge port and the plurality of pressure compartments, wherein the liquid supplied from the at least one supply port flows into the plurality of pressure compartments via the plurality of first pillar structures, and the liquid that has passed through between the plurality of flow path walls is discharged from the at least one discharge port via the plurality of second pillar structures.

10. The liquid ejection head according to claim 9, wherein a longest clearance between the plurality of second pillar structures is smaller than a shortest clearance between the plurality of flow path walls and the plurality of second pillar structures.

11. The liquid ejection head according to claim 9, wherein the plurality of second pillar structures is arranged closer to the at least one discharge port than an intermediate position between the at least one discharge port and the plurality of pressure compartments.

12. The liquid ejection head according to claim 9, wherein the plurality of flow path walls is arranged at predetermined intervals, and a longest clearance between the plurality of second pillar structures is smaller than a clearance between adjacent two of the plurality of flow path walls.

13. The liquid ejection head according to claim 9, wherein the plurality of second pillar structures is arranged in line at predetermined intervals, and wherein a distance from a row of the plurality of second pillar structures to the at least one discharge port is shorter than a distance from the row of the plurality of second pillar structures to the plurality of flow path walls.

14. The liquid ejection head according to claim 9, further comprising a sidewall surrounding the at least one supply port, the at least one discharge port, the plurality of first pillar structures, the plurality of second pillar structures, and the plurality of pressure compartments, wherein a clearance between the sidewall and a second pillar structure adjacent to the sidewall of the plurality of second pillar structures is smaller than a shortest clearance between the plurality of flow path walls and the plurality of second pillar structures.

15. The liquid ejection head according to claim 14, wherein the sidewall includes a first sidewall extending in a first direction, wherein the at least one discharge port comprises a plurality of discharge ports arranged in line in the first direction adjacent to the first sidewall, wherein the plurality of second pillar structures forms a plurality of pillar structure lines each provided to a corresponding discharge port of the plurality of discharge ports, and wherein the plurality of pillar structure lines is each formed in a C-like shape so as to surround the corresponding discharge port, and the corresponding discharge port is defined by the pillar structure line having the C-like shape and the first sidewall.

16. The liquid ejection head according to claim 14, wherein the sidewall includes a first sidewall extending in a first direction and two second sidewalls parallel to each other and extending from both ends of the first sidewall in a second direction intersecting with the first direction, wherein the at least one discharge port comprises a plurality of discharge ports arranged in line in the first direction adjacent to the first sidewall, wherein the plurality of second pillar structures includes a first pillar structure line extending in the first direction and a plurality of second pillar structure lines arranged between the plurality of discharge ports and extending in the second direction, and wherein the plurality of discharge ports is defined by the first pillar structure line, the plurality of second pillar structure lines, the first sidewall, and the two second sidewalls.

17. The liquid ejection head according to claim 9, wherein the plurality of first pillar structures and the plurality of second pillar structures are arranged line-symmetrically with respect to a center line of a row of the plurality of flow path walls.

* * * * *